United States Patent [19]

Posey et al.

[11] 4,445,935

[45] May 1, 1984

[54] METHOD FOR THE RECOVERY OF SILVER FROM WASTE PHOTOGRAPHIC FIXER SOLUTIONS

[75] Inventors: Franz A. Posey, Concord; Aloysius A. Palko, Oak Ridge, both of Tenn.

[73] Assignee: The United States of America as represented by the United States Department of Energy, Washington, D.C.

[21] Appl. No.: 449,312

[22] Filed: Dec. 13, 1982

[51] Int. Cl.$^3$ .............................................. C22B 11/06
[52] U.S. Cl. .................................... 75/118 P; 75/114; 75/101 R; 423/34; 423/38
[58] Field of Search ............. 75/118 P, 118 R, 101 R, 75/108, 109, 114; 423/27, 34, 38

[56] References Cited

U.S. PATENT DOCUMENTS 3,594,157  7/1971  Hendrickson et al. ............ 75/118 P

FOREIGN PATENT DOCUMENTS 619283  3/1949  United Kingdom .............. 75/118 P

Primary Examiner—Edward J. Meros
Assistant Examiner—Robert L. Stoll
Attorney, Agent, or Firm—Earl L. Larcher; Stephen D. Hamel; Michael F. Esposito

[57] ABSTRACT

The method of the present invention is directed to the recovery of silver from spent photographic fixer solutions and for providing an effluent essentially silver-free that is suitable for discharge into commercial sewage systems. The present method involves the steps of introducing the spent photographic fixer solution into an alkaline hypochlorite solution. The oxidizing conditions of the alkaline hypochlorite solution are maintained during the addition of the fixer solution so that the silver ion complexing agents of thiosulfate and sulfite ions are effectively destroyed. Hydrazine monohydrate is then added to the oxidizing solution to form a reducing solution to effect the formation of a precipitate of silver which can be readily removed by filtration or decanting. Experimental tests indicate that greater than 99.99% of the original silver in the spent photographic fixer can be efficiently removed by practicing the present method. Also, the chemical and biological oxygen demand of the remaining effluent is significantly reduced so as to permit the discharge thereof into sewage systems at levels in compliance with federal and state environmental standards.

8 Claims, No Drawings

METHOD FOR THE RECOVERY OF SILVER FROM WASTE PHOTOGRAPHIC FIXER SOLUTIONS

This invention was made as a result of a contract with the U.S. Department of Energy.

BACKGROUND OF THE INVENTION

The present invention relates generally to the recovery of silver from spent photographic fixer solutions and, more particularly, to a method for treating such solutions for effecting silver recovery and the conditioning of the remaining effluent for discharge into a sewage system.

Spent photographic fixer solutions contain up to about 6 gms/liter of dissolved silver along with relatively high concentrations of silver complexing agents such as thiosulfate and sulfite ions and other ions of such as halides, acetates, ammonium, and aluminum. Various state and federal regulations severely restrict the discharge of spent photographic fixer solutions into sewage systems or the environment because of the silver content and the excess level in biological and chemical oxygen demand due to the presence of oxidizable ions such as thiosulfate and sulfite. A number of silver recovery and effluent conditioning procedures have been reported in the literature and these procedures generally fall into one of three broad categories such as electrochemical, ion exchange or precipitation techniques. Attempts to commercialize these methods, however, have revealed a wide variety of economic or technical problems which render them not readily amenable for use in large-scale silver recovery and effluent conditioning as required for photoreproduction plants. For example, such problems include prolonged reaction times, insoluble sludge formation, the use of expensive or undesirable additives and increased cost for mainline or auxiliary process equipment. Also, these prior art techniques often fail to achieve the intended degree of silver recovery thereby producing undesirable effluents that may present a toxic solid waste disposal problem.

SUMMARY OF THE INVENTION

Accordingly, it is the primary aim or objective of the present invention to provide a method for significantly reducing the silver content of spent photographic fixer solutions and for producing an essentially silver-free effluent that is suitable for discharge directly into municipal sewage systems. Generally, the method of the present invention for recovering metallic silver from the spent photographic solution which contains therein silver ions complexed by oxidizable complexing agents comprises the steps of introducing the fixer solution into a basic aqueous solution containing an adequate amount of sodium hypochlorite to effect destruction by oxidation of the complexing agents and then subsequently contacting this combined solution with an aqueous solution containing hydrazine in an effective amount to form a colloidal precipitate of silver which is thereafter recovered from the combined solution. The silver is recovered as a form of a spongy silver precipitate which can be readily converted to pure metal. No sludges are produced and both biological oxygen demand and the chemical oxygen demand of the effluent are reduced significantly so as to substantially overcome limitations and shortcomings attendant with the prior art processes. The two-step process of the present invention utilizes oxidation-reduction agents, i.e., aqueous solutions of sodium hypochlorite and hydrazine monohydrate to effect the removal of silver from spent photographic fixer solutions with an efficiency in excess of 99% and also accomplish a dramatic reduction in the biological and chemical oxygen demand of the final effluent. The principal complexing agents for the silver ions and the spent photographic fixer solutions are thiosulfate and sulfite ions which are effectively destroyed by the reaction with sodium hypochlorite. Some of the silver is precipitated as silver chloride which can be filtered off as desired and the remaining silver reduced to metallic silver by addition of hydrazine monohydrate. However, if desired, the hydrazine may be added directly to the reaction vessel prior to the filtration of the silver chloride to convert essentially all of the silver to the spongy silver precipitate which can be readily separated from the liquid phase by filtration or decantation.

Other and further objects of the invention will be obvious upon an understanding of the illustrative method to be described or will be indicated in the appended claims, and various advantages not referred to herein will occur to one skilled in the art upon employment of the invention in practice.

DETAILED DESCRIPTION OF THE INVENTION

Spent photographic fixer solutions contain up to about 6 gms/liter of silver which represents a significant concentration of recoverable silver. The silver ions are complexed in these solutions by the principal complexing agents consisting of thiosulfate (hypo) and sulfite ions. In accordance with the method of the present invention, the destruction of the thiosulfate and sulfite ions is achieved by adding the spent photographic fixer solution to a solution of alkaline hypochlorite. The waste photographic fixer solution containing the silver is introduced into a stirred reaction vessel containing sodium hypochlorite oxidizer. During this addition, the oxidation-reduction potential of the combined solution may be continually monitored by employing a conventional high-impedance voltmeter. Additional oxidizer may be added to maintain the desired oxidizing conditions of the combined solution. These desired oxidizing conditions are defined herein as those having an oxidation-reduction potential in excess of about +0.15 volt versus a saturated calomel electrode or a pH within the range of about 9.5 to 14.0. Following the destruction by oxidation of the aforementioned silver ion complexing agents, a reducing agent of hydrazine is introduced into the stirred reaction vessel to effect the precipitation of at least about 99% of the silver in a substantially contaminant-free form. This silver precipitate may be readily converted to essentially pure metal by heating in the presence of hydrogen. Typical operating durations for effecting the method of the present invention range from about 1 to 3 days for the oxidation reaction and about 1 to 7 days for the reduction step. It is essential for the effectiveness of the present invention to conduct the destruction of the silver complexing agents by the addition of the waste solution to the oxidizing solution rather than the reverse since it is necessary that the addition occurs under oxidizing conditions. Undesirable quantities of silver sulfide ($Ag_2S$) will be precipitated under the reducing conditions provided by the addition of the hypochlorite to the spent fixer. While silver sulfide is quite insoluble, it readily forms a colloidal precipitate which is extremely difficult to filter and presents potential $H_2S$ toxicity and/or sludge disposal problems. Preliminary experiments have established that the use of sodium hypochlorite was preferable to other common oxidizing agents such as hydrogen peroxide which tends to promote the undesirable formation of silver sulfide.

The method may be practiced in a stirred reaction vessel of any suitable configuration. To this vessel is added an oxidizing solution having about 10 to 15 wt. % sodium hypochlorite. Preferably, a sufficient alkaline base such as sodium hydroxide is added to the reaction vessel so that a resultant solution of about 1.0 to 1.5 M with respect to sodium hydroxide is provided. Typically, about 35 to 60 gms of sodium hydroxide is required for each liter of sodium hypochlorite added to the reaction vessel. It has been found that additions of sodium hydroxide much lower than about 35 gms/liter will require an inordinate amount of sodium hypochlorite to accomplish the oxidation of the photographic fixer solution. The complete omission of sodium hydroxide may require up to about 60% more sodium hypochlorite to complete the oxidation of the photographic fixer oxidation. Additions of sodium hydroxide of more than about 60 gms/liter are not necessary to accomplish the desired result and, in fact, produce undesirably slow reaction rates. Accordingly, a solution having about 1.0 M with respect to sodium hydroxide appears to be the optimum solution.

To assure the presence of satisfactory oxidizing conditions in the hypochlorite solution a suitable commercially available high-impedance voltmeter may be used. Preferably, the voltmeter is placed in an actuating condition with respect to the solution by using an inert electrode of platinum or gold and a suitable reference electrode such as a saturated calomel electrode. Oxidizing conditions in the order of about $+0.3$ volt to $+0.5$ volt versus a saturated calomel electrode should be maintained to effect satisfactory oxidation of the silver ion complexing agents.

To initiate destruction of the silver complexing agents contained in the photographic fixer solution, the latter is added to the oxidizing solution contained in the stirred reaction vessel at a rate of approximately 500 ml waste fixer solution per hour for every three liters of oxidizing solution. This relatively slow rate of addition is necessary to moderate the effects of a highly exothermic reaction occurring in the reaction vessel during the oxidation. The final solution temperature at the reaction endpoint of no greater than about 90° C. is desired to inhibit possible boiling of the combined solution.

During the addition of the photographic fixer solution the oxidation-reduction potential of the alkaline solution in the vessel will decrease and a whitish-colored precipitate of silver chloride will form in the solution. Preferably, the addition of the waste solution should be stopped whenever the voltmeter indicates that the oxidation-reduction potential of the solution drops to a value below about $+0.15$ volt versus a saturated calomel electrode. At potentials much below this point as indicated by a darkening of the solution, the solution is at an oxidation level insufficient to prevent deleterious formation of the highly insoluble silver sulfide. This low oxidation level solution can be readily corrected by adding additional hypochlorite solution to the stirred vessel until the oxidation-reduction potential increases to the desired level in the range of about $+0.30$ to about $+0.40$ volt versus a saturated calomel electrode. The addition of the excess oxidizing solution and the aforementioned elevated temperature of about 90° should be sufficient to reverse any silver sulfide precipitate back to a chloride form.

The oxidation-destruction phase of the method of the present invention is completed by allowing the combined solution to stand without agitation for about one to three days before initiating the reduction phase of the method. Some silver chloride and/or silver bromide precipitate may be formed during this step. In order to minimize the process steps, this precipitate may remain within the reaction vessel without being separated. However, if desired, the precipitate of silver chloride or silver bromide may be filtered off.

To effect the reduction step, a small amount of reducing agent, i.e., an aqueous solution of about 85% by weight of hydrazine monohydrate, is added to the reaction vessel with stirring. The oxidation-reduction potential is again monitored by the voltmeter until the potential attains a value of about $-0.5$ volt versus a saturated calomel electrode. At this negative potential, a grayish colloidal precipitate of silver will form and subsequently agglomerate into spongy metallic clumps. Agitation of the vessel contents is then provided for about 1 additional hour while maintaining a potential therein of about $-0.5$ volt. More reducing agent may be added to the vessel if necessary to maintain this potential. Thereafter, the reaction vessel contents should be allowed to stand without stirring for a duration of about 1 to 7 days until the silver precipitation is complete and the solution acquires a colorless and clear appearance. Following complete settling, the silver may be directly recovered from the solutions by application of conventional processes such as filtering, centrifugation, decanting and the like.

The effluent remaining after the removal of the silver satisfies the environmental discharge regulations for solutions containing silver. Further, the chemical oxygen demand for the effluent is reduced from levels greater than about 100,000 mg/l in the spent photographic fixer to a value less than about 2,000 mg/l The biological oxygen demand of the effluent is also reduced from a level greater than about 20,000 mg/l in the spent photographic fixer solution to less than about 2,000 mg/l in the effluent. As pointed out above, if a pure metallic form of silver is required the spongy precipitate removed from the solution may be washed and melted in a conventional reducing furnace such as utilized for the reduction of refined metals.

The following examples are presented to demonstrate the effectiveness of the method of the present invention for conditioning toxic waste photographic fixer solutions and for recovering substantially pure silver therefrom.

EXAMPLE I

Approximately 30 ml portions of spent photographic fixer solutions containing approximately 5.0 g of silver per liter of solution were slowly added to five reaction vessels each containing 200 ml of oxidizing solution provided by an aqueous solution of approximately 10 wt. % hypochlorite and varying amounts of excess sodium hydroxide within the equivalent range of 35 to 60 grams of sodium hydroxide for each liter of sodium hypochlorite solution. The addition of the photographic fixer solution took place while agitating the solution at a rate equivalent to about 500 ml of waste solution per hour for every three liters of oxidizing solution. Upon completion of the addition of the fixer solution to the oxidizing solution, the combined solutions were allowed to stand for a week or more to assure complete oxidation of the silver ion complexing agents and other toxic pollutants. The precipitated silver chloride which had settled to the bottom of the reaction vessels was removed by filtration and the filtrate was analyzed for remaining silver solubility. This solubility remained at a relatively high level of 200 to 300 mg of silver per liter of solution compared to the reported solubility of silver chloride in distilled water at 25° C.

A 75 ml aliquot of each of the five oxidized solutions was then treated with about 0.5 ml of an aqueous solution of about 85 wt. % hydrazine monohydrate. After the addition of the monohydrate and allowing the solution to stand for a three day duration, the reduced solutions were filtered to recover precipitated silver. The remaining effluents were also analyzed to determine the remaining soluble silver content to indicate the efficiency of the silver recovery as compared to the original silver content in the spent photographic fixer solution. The effluents were found to have been reduced in silver content by a factor in excess of 10,000 on a basis of an original content of approximately 5 gm/l down to less than 0.5 mg/l which is indicative of a silver removal efficiency in excess of 99.99%. During the foregoing experiments the contents of each reaction vessel were monitored by a high impedance voltmeter equipped with a calomel reference electrode and a platinum electrode to assure that the oxidizing solution remained in the desired oxidizing range and that the reducing solution was of the necessary strength to effect the reduction of soluble silver in the solution.

EXAMPLE II

The procedures of Example I were repeated on a larger scale to demonstrate the adaptability of the subject method to commercial quantities of spent photographic fixer solution. In this example, a waste solution comprising 459 ml of spent photographic fixer having a recovery content of 5.3 g of silver per liter of solution was added at a rate approximately 500 ml/h to 3 liters of an oxidizing solution formed of 1.36 M sodium hypochlorite containing 120 g of excess sodium hydroxide. The solution oxidation-reduction potential, when approximately 80 additional ml of sodium hypochlorite were added to the solution, indicated an oxidizing condition of about +0.35 volt versus a saturated calomel electrode. Thereafter, the variation of soluble silver content for samples of the oxidized solution, which was filtered to remove precipitated silver chloride, was monitored as a function of time over a standing period of one week. As indicated in Table I below, a standing duration of about 1 to 3 days appears to provide the optimum time for waste photographic fixer solutions. As indicated in the Table for the passage of greater time, the soluble silver tends to increase without added benefit because of slow redissolution of the finely-divided silver chloride precipitate. Oxidation periods of duration less than about 1 day are insufficient for accomplishing desired removal efficiency of silver as well as the oxidation of other toxic pollutants.

Upon completing the desired oxidation period, the oxidized solutions were treated with about 3 ml of a reducing solution of 85 wt. % hydrazine monohydrate. The solution oxidation-reduction potential was observed to shift with this addition of the reducing solution from about +0.4 volt versus a saturated calomel electrode to less than about −0.5 volt. Chemical analysis of the effluent after separation of the precipitated silver revealed a silver content of less than 0.5 mg of silver/l of solution, again indicating a silver removal efficiency of greater than 99.99%. The effluent was also analyzed for levels of biological and chemical demand and found to have significantly lower levels as compared to the corresponding values of spent photographic fixer solutions. More specifically, the biological oxygen demand was reduced from about 20,000 mg/l in the photographic fixer down to about 2,000 mg/l in the effluent while the chemical oxygen demand was correspondingly reduced from about 100,000 mg/l to about 2,000 mg/l.

TABLE I

Post-Oxidation Silver Solubility

| Time (days) | Silver Solubility (mg/l) |
|---|---|
| 1 | 153 |
| 3 | 145 |
| 4 | 174 |
| 7 | 214 |
| 8 | 228 |

EXAMPLE III

The procedures of Example I were again repeated using larger volumes of reagents to determine optimal duration of time for the reduction phase of the invention. A waste solution of 2.5 l of spent photographic fixer having dissolved silver content of 6.5 g of silver per liter of solution was added at a rate of 1.7 l/h to about 16 liters of a 13 wt. % sodium hypochlorite solution containing 640 g of sodium hydroxide. When this solution oxidation-reduction potential reached a value of +0.15 volt versus a saturated calomel electrode during the addition, the solution was back titrated with about 400 ml of additional sodium hypochlorite solution until the oxidation-reduction potential was increased to the desired oxidation conditions of about +0.3 volt versus a saturated calomel electrode. After a standing period of 6 days, about 15 ml of 85 wt. % hydrazine monohydrate was added to the filtered solution. The oxidation-reduction potential was then −0.5 volt versus a saturated calomel electrode. Chemical analysis of the resultant solution was performed periodically for a period of about one month with results listed in Table II below. As indicated in this Table, the reaction vessel may be allowed to stand up for about one week before the silver content undesirably rises because of redissolution of the settled silver precipitate. It is found that a range of about 1 to 7 days is the optimal duration for completing the reduction of the spent photographic fixer. Passage of less than one day, however, is inadequate to achieve the desired degree of reduction and to generate a relatively easily filterable precipitate. Analysis by inductively coupled plasma atomic emission spectroscopy of the recovered and washed silver revealed relatively pure silver containing only trace amounts of iron, bromide, strontium and calcium. No detectable amounts of sulfur, selenium, copper, zinc or nickel were observed.

TABLE II

| Post-Reduction Silver Solubility | |
|---|---|
| Time (days) | Silver Solubility (mg/l) |
| 1 | 0.14 |
| 2 | 0.13 |
| 3 | 0.15 |
| 7 | 0.13 |
| 15 | 0.50 |
| 31 | 0.83 |

It will be seen that the described invention provides an efficient method for recovering silver from spent photographic fixer solutions as well as effecting substantial reductions in the biological and chemical oxygen demand of the photographic fixer solutions. As a direct result of practicing the present method, effective silver recovery may be achieved while simultaneously providing environmentally acceptable effluents. While it is contemplated that the method of the present invention may be satisfactorily utilized for treating photo-processing effluents of large scale photoreproduction plants, there are numerous plating operations wherein cyanide or sulfide complexing agents are employed to complex noble metals. Thus, noble metals such as gold, platinum, iridium, rhodium or mercury may be recovered by practicing the method of the present invention.

What is claimed is:

1. A method for recovering metallic silver from a spent photographic fixer solution containing therein silver ions complexed by oxidizable complexing agents, comprising the steps of:
   introducing the fixer solution into an aqueous alkaline solution containing an adequate amount of sodium hypochlorite to effect destruction by oxidation of the silver complexing agents,
   contacting the resulting combined solution with an aqueous solution containing hydrazine in an effective amount to form a colloidal precipitate of silver; and
   thereafter recovering the silver precipitate from the combined solution.

2. The method claimed in claim 1 including the additional step of allowing the combined solution to stand for a duration of at least 24 hours prior to the addition of the aqueous solution containing the hydrazine.

3. The method claimed in claim 2 including the additional step of allowing the combined solution containing the hydrazine to stand for a duration sufficient for the silver precipitate to settle and the solution to clear prior to the recovery of the silver precipitate from the solution.

4. The method claimed in claim 1 wherein the solution containing the sodium hypochlorite comprises about 10 to 15 wt. % hypochlorite and an adequate amount of sodium hydroxide to provide about a 1 to 1.5 M solution with respect to sodium hydroxide and an oxidation-reduction potential of +0.5 volt as compared to a saturated calomel electrode.

5. The method claimed in claim 4 wherein the photographic fixer solution is added to the sodium hypochlorite solution at a rate of about 500 ml/h for every three liters of sodium hypochlorite solution or at a rate sufficient to provide a sodium hypochlorite solution temperature of about 90° C. at the endpoint of the oxidizing reaction.

6. The method claimed in claim 5 wherein oxidizing conditions of the sodium hypochlorite solution are maintained at said sufficient level by introduction of additional sodium hypochlorite solution thereinto, and wherein the introduction of the additional sodium hypochlorite solution is at an amount sufficient to maintain the combined solution at an oxidation-reduction potential in the range of about +0.3 to +0.4 volt versus a saturated calomel electrode.

7. The method claimed in claim 5 including the additional step of removing a precipitate of silver chloride formed during the introduction of the photographic fixer solution into the sodium hypochlorite solution at a time prior to contacting the photographic fixer solution and the sodium hypochlorite solution with the hydrazine solution.

8. A method for directly recovering metallic silver from spent photographic fixer solutions containing therein reducible silver ions, solubilized by oxidizable complexing agents, comprising the steps of:
   adding the spent photographic fixer solution at a rate of about 500 ml of fixer solution per hour for every three liters of an aqueous solution containing about 10 to 15 wt. % sodium hypochlorite and about 35 to 40 grams of sodium hydroxide per liter of solution to form a combined solution and effect destruction of the oxidizable silver ion complexing agents;
   maintaining the oxidizing condition of the resulting combined solution over a duration of about 1 to 3 days at an oxidation-reduction potential in the range of about +0.3 to +0.4 volt versus a saturated calomel electrode;
   thereafter contacting the combined solution with an aqueous solution containing about 85 wt. % hydrazine monohydrate in an effective amount to produce an oxidation-reduction potential of about −0.5 volt versus a saturated calomel electrode in the combined solution to effect the reduction of a silver precipitate of the desolubilized silver provided by the oxidation of the silver ion complexing agents; and
   after a 1 to 7 day duration of maintaining the oxidation-reduction potential at approximately −0.5 volt versus a saturated calomel electrode removing the silver precipitate from the combined solution.

* * * * *